US012236529B2

(12) United States Patent
Brennan et al.

(10) Patent No.: US 12,236,529 B2
(45) Date of Patent: Feb. 25, 2025

(54) GRAPHICS DISCARD ENGINE

(71) Applicants: Advanced Micro Devices, Inc., Santa Clara, CA (US); ATI Technologies ULC, Markham (CA)

(72) Inventors: Christopher J. Brennan, Boxborough, MA (US); Randy Wayne Ramsey, Orlando, FL (US); Nishank Pathak, Orlando, FL (US); Ricky Wai Yeung Iu, Markham (CA); Jimshed Mirza, Markham (CA); Anthony Chan, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/562,653

(22) Filed: Dec. 27, 2021

(65) Prior Publication Data
US 2023/0206559 A1 Jun. 29, 2023

(51) Int. Cl.
*G06T 17/20* (2006.01)
*G06T 1/60* (2006.01)
*G06T 15/00* (2011.01)
*G06T 17/10* (2006.01)

(52) U.S. Cl.
CPC ............... *G06T 17/20* (2013.01); *G06T 1/60* (2013.01); *G06T 15/005* (2013.01); *G06T 17/10* (2013.01)

(58) Field of Classification Search
None
See application file for complete search history.

(56) References Cited

U.S. PATENT DOCUMENTS

| 5,826,082 | A | 10/1998 | Bishop et al. |
| 7,383,423 | B1 | 6/2008 | Hughes et al. |
| 7,533,371 | B1 * | 5/2009 | Johns ............... G06F 11/323 717/124 |
| 7,626,588 | B1 * | 12/2009 | Molnar ............. G06F 12/0802 345/557 |
| 8,760,460 | B1 | 6/2014 | Kilgariff et al. |
| 10,079,916 | B2 | 9/2018 | Roberts et al. |

(Continued)

OTHER PUBLICATIONS

International Search Report and Written Opinion of International Application No. PCT/US2022/080402, date mailed Mar. 27, 2023, 12 pgs.

*Primary Examiner* — Andrew G Yang
(74) *Attorney, Agent, or Firm* — Kowert, Hood, Munyon, Rankin & Goetzel, P.C.; Rory D. Rankin (57) ABSTRACT

Systems, apparatuses, and methods for implementing a discard engine in a graphics pipeline are disclosed. A system includes a graphics pipeline with a geometry engine launching shaders that generate attribute data for vertices of each primitive of a set of primitives. The attribute data is consumed by pixel shaders, with each pixel shader generating a deallocation message when the pixel shader no longer needs the attribute data. A discard engine gathers deallocations from multiple pixel shaders and determines when the attribute data is no longer needed. Once a block of attributes has been consumed by all potential pixel shader consumers, the discard engine deallocates the given block of attributes. The discard engine sends a discard command to the caches so that the attribute data can be invalidated and not written back to memory.

20 Claims, 9 Drawing Sheets

(56) References Cited

U.S. PATENT DOCUMENTS

| | | | |
|---|---|---|---|
| 10,810,784 B1* | 10/2020 | Rai | G06F 9/3851 |
| 2007/0165042 A1* | 7/2007 | Yagi | G06F 12/0875 |
| | | | 345/557 |
| 2007/0252843 A1* | 11/2007 | Yu | G06T 1/60 |
| | | | 345/557 |
| 2011/0161616 A1 | 6/2011 | Tarjan et al. | |
| 2014/0204106 A1* | 7/2014 | Hakura | G06T 1/60 |
| | | | 345/543 |
| 2015/0054827 A1* | 2/2015 | Hakura | G06T 1/20 |
| | | | 345/426 |
| 2017/0139707 A1 | 5/2017 | Jang | |
| 2017/0372506 A1* | 12/2017 | Surti | G06T 15/80 |
| 2018/0181488 A1 | 6/2018 | Fowler et al. | |
| 2020/0379909 A1* | 12/2020 | Uhrenholt | G06F 12/0831 |
| 2022/0050790 A1* | 2/2022 | Goodman | G06T 1/20 |
| 2022/0114016 A1* | 4/2022 | Goudie | G06F 9/5038 |
| 2024/0037696 A1* | 2/2024 | Tanaka | G06F 12/00 |
| 2024/0331298 A1* | 10/2024 | Lacey | G06T 17/10 |

\* cited by examiner

GRAPHICS DISCARD ENGINE

BACKGROUND

Description of the Related Art

Three-dimensional (3-D) graphics are often processed using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels to be displayed to a user. The triangles, other polygons, and patches are collectively referred to as primitives.

In a typical graphics pipeline, a sequence of work-items, which can also be referred to as threads, are processed so as to output a final result. Each processing element executes a respective instantiation of a particular work-item to process incoming data. A work-item is one of a collection of parallel executions of a kernel invoked on a compute unit. A work-item is distinguished from other executions within the collection by a global ID and a local ID. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation. A subset of work-items in a workgroup that execute simultaneously together on a compute unit can be referred to as a wavefront, warp, or vector. The width of a wavefront is a characteristic of the hardware of the compute unit.

Graphics processing pipelines include a number of stages that perform individual tasks, such as transforming vertex positions and attributes, calculating pixel colors, and so on. Many of these tasks are performed in parallel by the collection of processing elements on the individual work items of wavefronts traversing the pipeline. Graphics processing pipelines are continually being updated and improved.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a discard engine in a graphics pipeline are disclosed herein. In one implementation, a system includes a graphics pipeline with a geometry engine launching shaders that generate attribute data for vertices of each primitive of a set of primitives. The attribute data is consumed by pixel shaders, with each pixel shader generating an attribute deallocation message when the pixel shader no longer needs the attribute data. A discard engine gathers deallocations from multiple pixel shaders and determines when the attribute data is no longer needed. Once a block of attributes has been consumed by all potential pixel shader consumers, the discard engine deallocates the given block of attributes. The discard engine sends a discard command to the caches so that the attribute data can be invalidated and not written back to memory.

Figure 1:
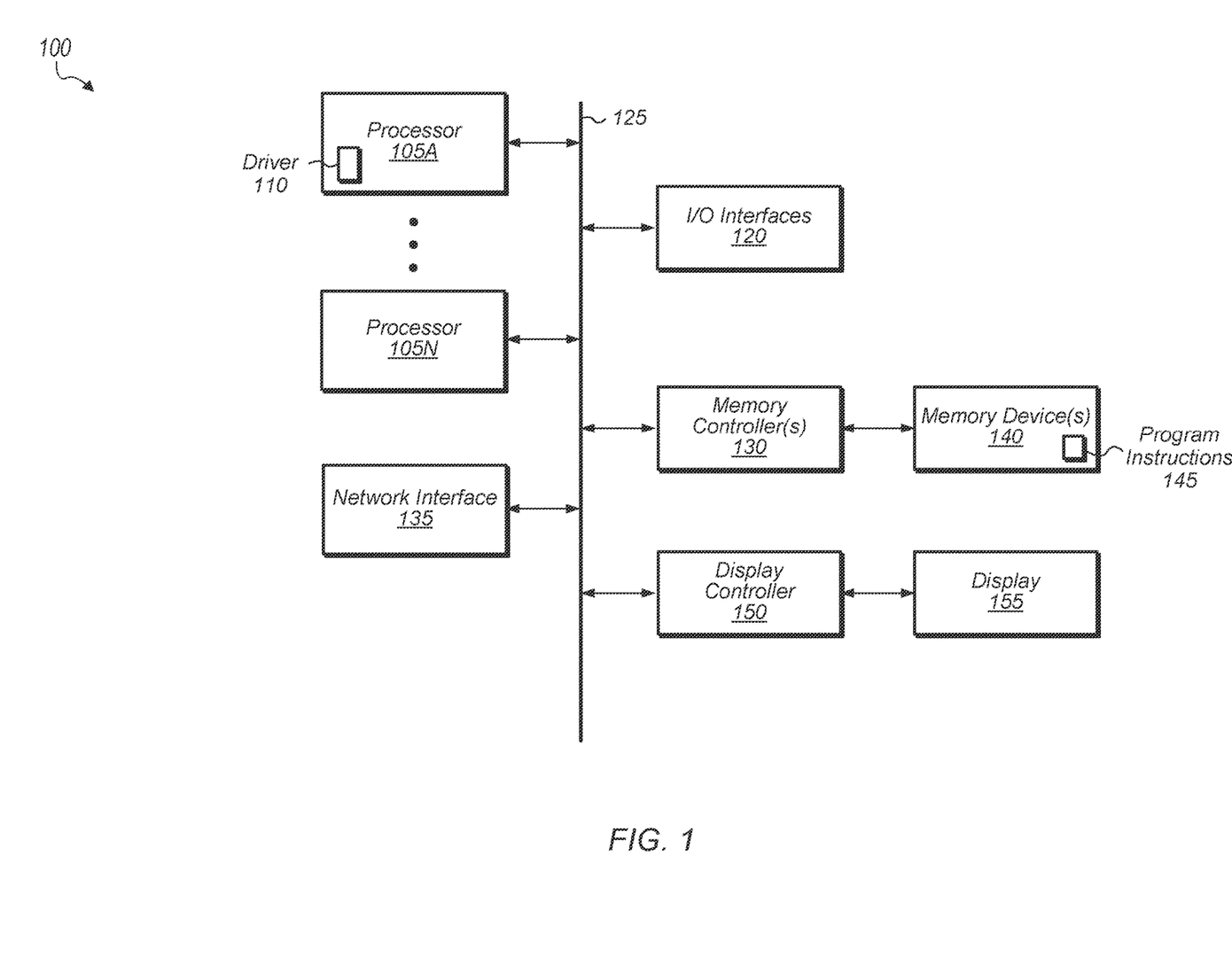
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. In one implementation, processor 105N is a data parallel processor with a highly parallel architecture, such as a graphics processing unit (GPU) which processes data, executes parallel processing workloads, renders pixels for display controller 150 to drive to display 155, and/or executes other workloads.

GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

In some implementations, an application executing on processor 105A utilizes a graphics application programming interface (API) to invoke a user mode driver 110 (or a similar GPU driver). In one implementation, user mode driver 110 issues one or more commands to a GPU for rendering one or more graphics primitives into displayable graphics images. Based on the graphics instructions issued by the application to the user mode driver 110, the user mode driver 110 formulates one or more graphics commands that specify one or more operations for the GPU to perform for rendering graphics. In some implementations, the user mode driver 110 is a part of an application running on a CPU. For example, the user mode driver 110 may be part of a gaming application running on the CPU. In one implementation, when driver 110 is a kernel mode driver, driver 110 is part of an operating system (OS) running on the CPU.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for an application, a second set of program instructions for a driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
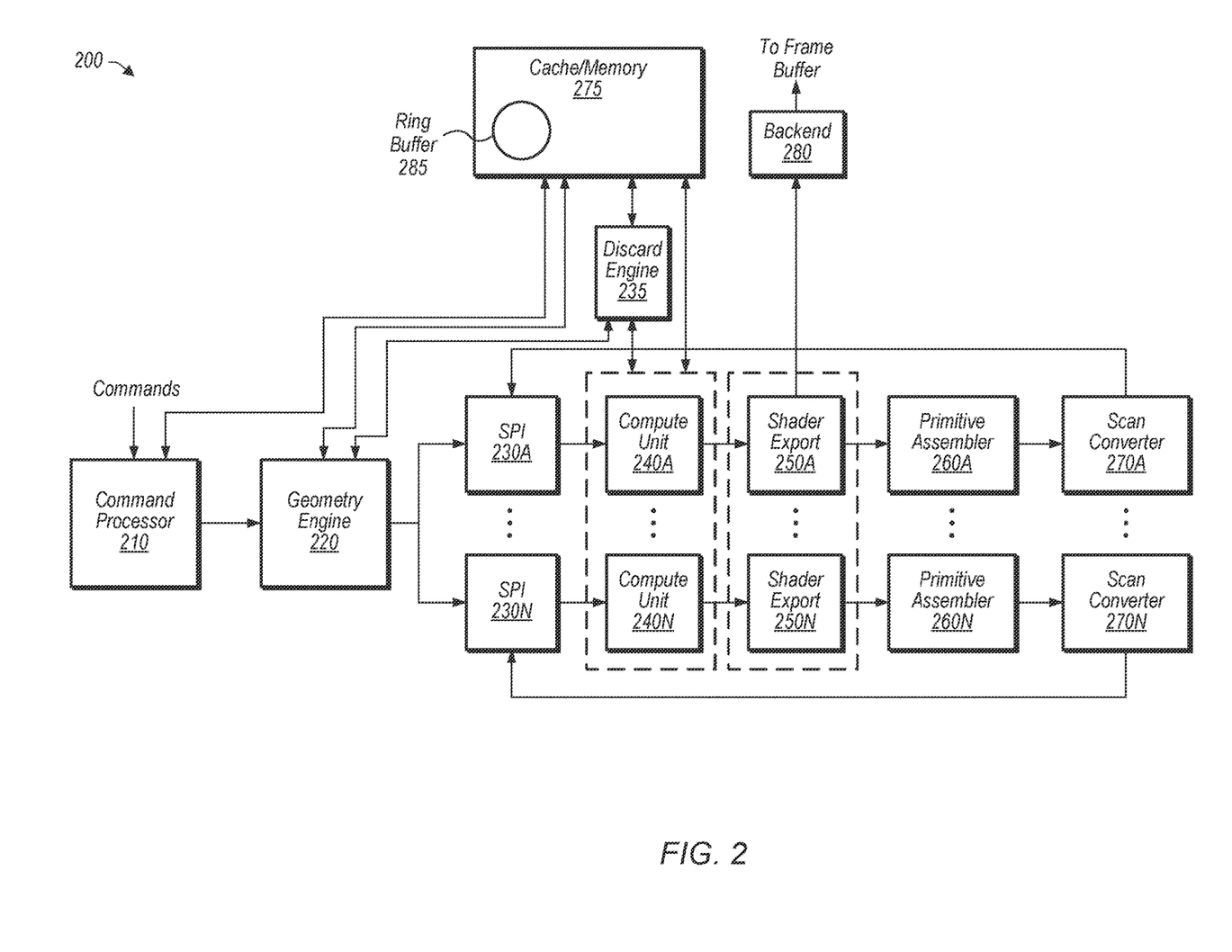
FIG. 2 is a block diagram of one implementation of a GPU.

Turning now to FIG. 2, a block diagram of one implementation of a GPU 200 is shown. In one implementation, command processor 210 processes commands received from a host processor (e.g., processor 105A of FIG. 1). Also, command processor 210 sets GPU 200 in the correct state to execute the received commands. In various implementations, the received commands are intended to cause GPU 200 to render various scenes of a video game application, movie, or other application. Based on commands received from command processor 210, geometry engine 220 processes indices according to the topology (e.g., points, lines, triangles) and connectivity of the scene being rendered. For example, in one implementation, geometry engine 220 processes a mesh based on quadrilateral primitives or triangle primitives that represent a three-dimensional (3D) object. In this example, geometry engine 220 reads vertices out of a buffer (stored in cache/memory 275) using fixed function operations, forming mesh geometry, and creating pipeline work items.

Geometry engine 220 is coupled to any number of shader processor inputs (SPIs) 230A-N, with the number varying according to the implementation. SPIs 230A-N accumulate work items until enough work items have been received to generate a wavefront, and then SPIs 230A-N launch the wavefronts on compute units 240A-N, respectively. Depending on the implementation, a wavefront can include 32 work items, 64 work items, or some other number of work items. It is noted that the terms "work item" and "thread" can be used interchangeably herein.

Compute units 240A-N execute shader programs to process the wavefronts received from SPIs 230A-N. In one implementation, a geometry front-end includes a vertex shader and a hull shader that operate on high order primitives such as patches that represent a three-dimensional (3D) model of a scene. In this implementation, the geometry front-end provides the high order primitives to a shader which generates lower order primitives from the higher order primitives. The lower order primitives are then replicated, shaded, and/or sub-divided before being processed by pixel engines. The pixel engines perform culling, rasterization, depth testing, color blending, and the like on the primitives to generate fragments or pixels for display. In other implementations, other types and/or sequences of shaders are employed to process the various wavefronts traversing the pipeline.

Compute units 240A-N read from and write to cache/memory 275 during execution of the shader programs. For example, in one implementation, geometry engine 220 launches shaders on compute units 240A-N which generate attribute data which is written to ring buffer 285. The attribute data can include any non-position data associated with vertices. For example, attribute data can include, but is not limited to, color, texture, translucency, surface normals, and the like. At a later point in time, pixel shaders launched on compute units 240A-N consume the attribute data from ring buffer 285. There are potentially multiple pixels that need to access the same attribute data, so to track when attribute data can be discarded, discard engine 235 tracks deallocations from pixel shaders. Once a given block of attributes have been consumed by all of its consumers, discard engine 235 sends a discard command to cache 275 with the address range of the given block of attributes. In response to receiving the discard command, cache 275 invalidates the corresponding data and prevents writebacks of dirty data to other cache levels and/or memory.

Shader export units 250A-N manage the outputs from the compute units 240A-N and forward the outputs either to the primitive assemblers 260A-N or the backend 280. For example, in one implementation, shader export units 250A-N export the positions of vertices after transformation. Primitive assemblers 260A-N accumulate and connect vertices that span primitives and pass the primitives to scan converters 270A-N which perform rasterization. Primitive assemblers 260A-N also perform culling for primitives that will not be visible. Scan converters 270A-N determine which pixels are covered by the primitives and forward the pixel data to SPIs 230A-N which will then launch pixel shader wavefronts on compute units 240A-N.

Figure 3:
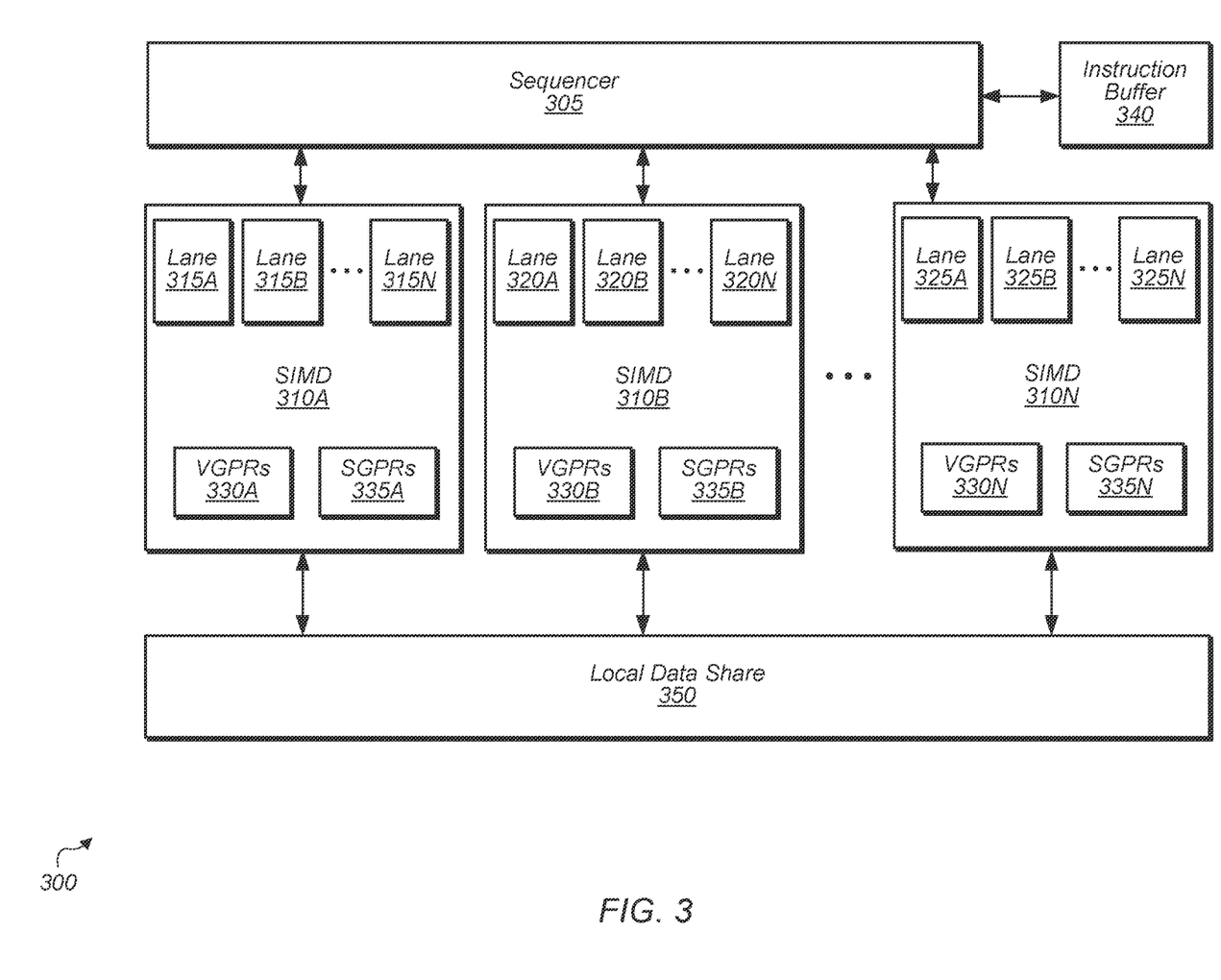
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, sequencer 305, instruction buffer 340, and local data share (LDS) 350. It is noted that compute unit 300 can also include other components which are not shown in FIG. 3 to avoid obscuring the figure. In one implementation, compute units 240A-N (of FIG. 2) include the components of compute unit 300.

In one implementation, compute unit 300 executes instructions of a kernel on any number of wavefronts. These instructions are stored in instruction buffer 340 and scheduled for execution on SIMDs 310A-N by sequencer 305. In one implementation, the width of a wavefront matches a number of lanes in lanes 315A-N, 320A-N, and 325A-N in SIMDs 310A-N. Each lane 315A-N, 320A-N, and 325A-N of SIMDs 310A-N can also be referred to as an "execution unit" or a "processing element".

In one implementation, GPU 300 receives a plurality of instructions for a wavefront with a number of work-items. When work-items execute on SIMDs 310A-N, each work-item is assigned a corresponding portion of vector general purpose registers (VGPRs) 330A-N, scalar general purpose registers (SGPRs) 335A-N, and local data share (LDS) 350. It is noted that the letter "N" when displayed herein next to various structures is meant to generically indicate any number of elements for that structure (e.g., any number of SIMDs 310A-N). Additionally, different references within FIG. 3 that use the letter "N" (e.g., SIMDs 310A-N and lanes 315A-N) are not intended to indicate that equal numbers of the different elements are provided (e.g., the number of SIMDs 310A-N can differ from the number of lanes 315A-N).

Figure 4:
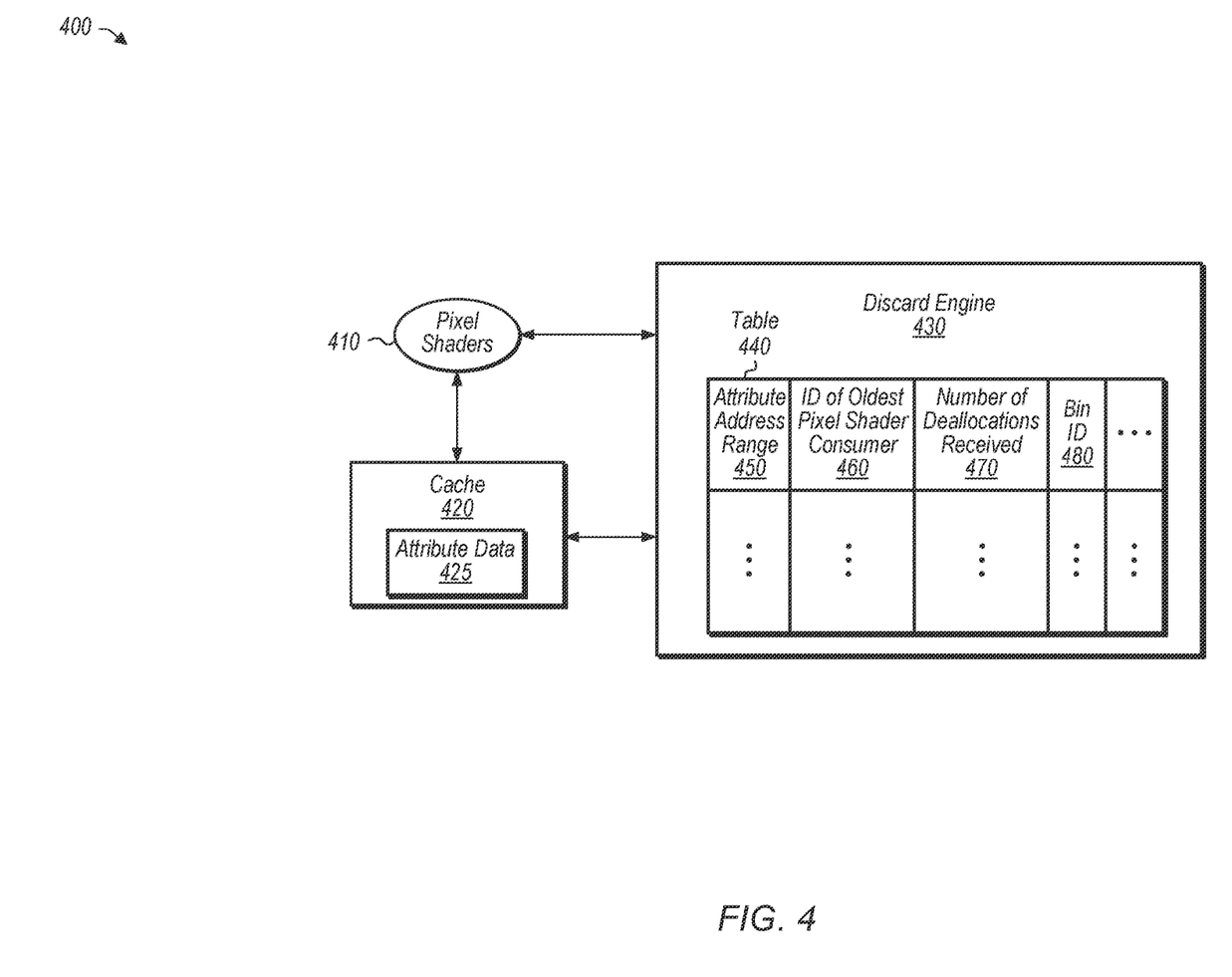
FIG. 4 is a block diagram of one implementation of a discard engine.

Turning now to FIG. 4, a block diagram of one implementation of a discard engine 430 is shown. As shown in FIG. 4, discard engine 430 is coupled to pixel shaders 410 and cache 420. Pixel shaders 410 are representative of any number of pixel shaders. During execution, pixel shaders 410 consume attribute data 425 from cache 420. When a given pixel shader 410 has finished consuming corresponding attribute data, the given pixel shader 410 sends a deallocation message to discard engine 430.

In one implementation, discard engine 430 tracks deallocation messages from pixel shaders 410 using table 440. In one implementation, each entry in table 440 includes an attribute address range field 450, identifier (ID) of oldest pixel shader consumer field 460, number of deallocations received field 470, bin ID 480, and any number of other fields. In other implementations, each entry in table 440 can be structured in other suitable manners and/or include other fields. When discard engine 430 determines that a given attribute range has been consumed by all of its consumers, discard engine 430 sends a discard command for the given attribute range to cache 420. In response to receiving the discard command, cache 420 invalidates the corresponding data and prevents writeback of dirty data which helps to reduce memory bandwidth usage.

Figure 5:
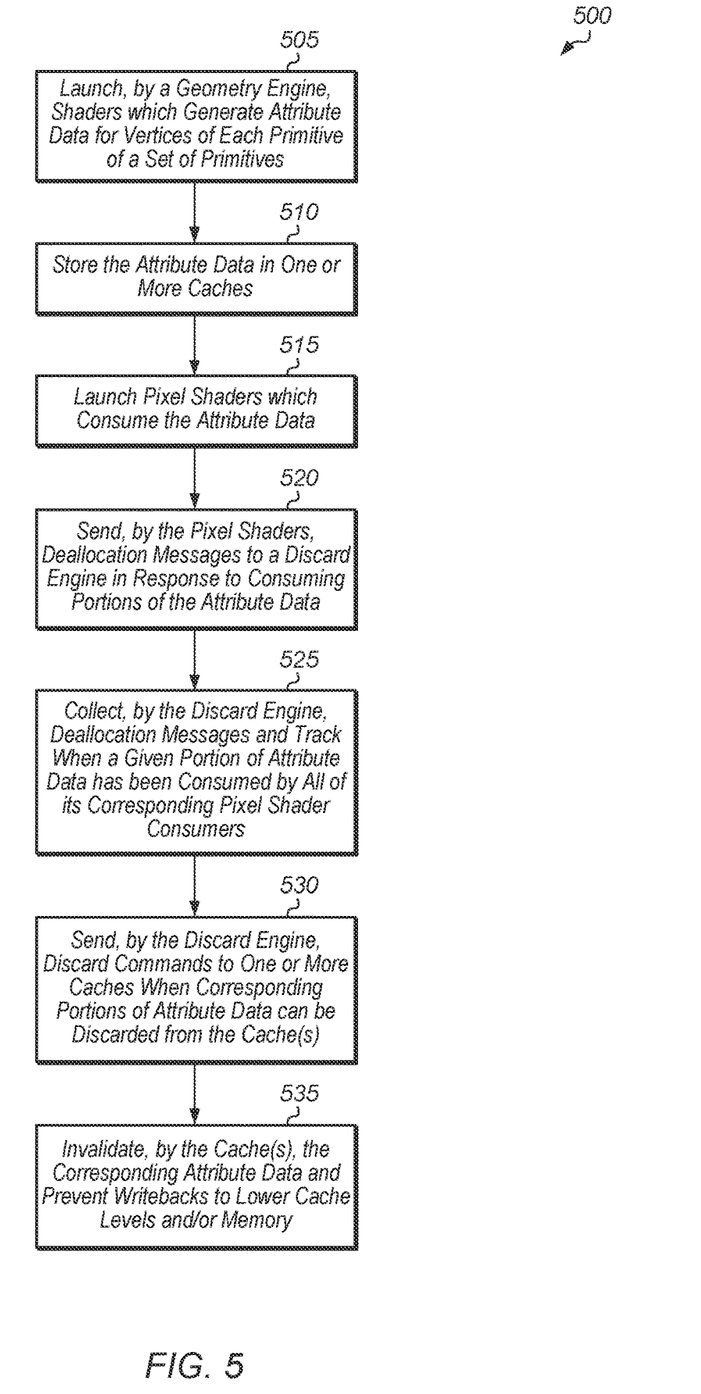
FIG. 5 is a generalized flow diagram illustrating one implementation of a method for operating a discard engine.
Figure 6:
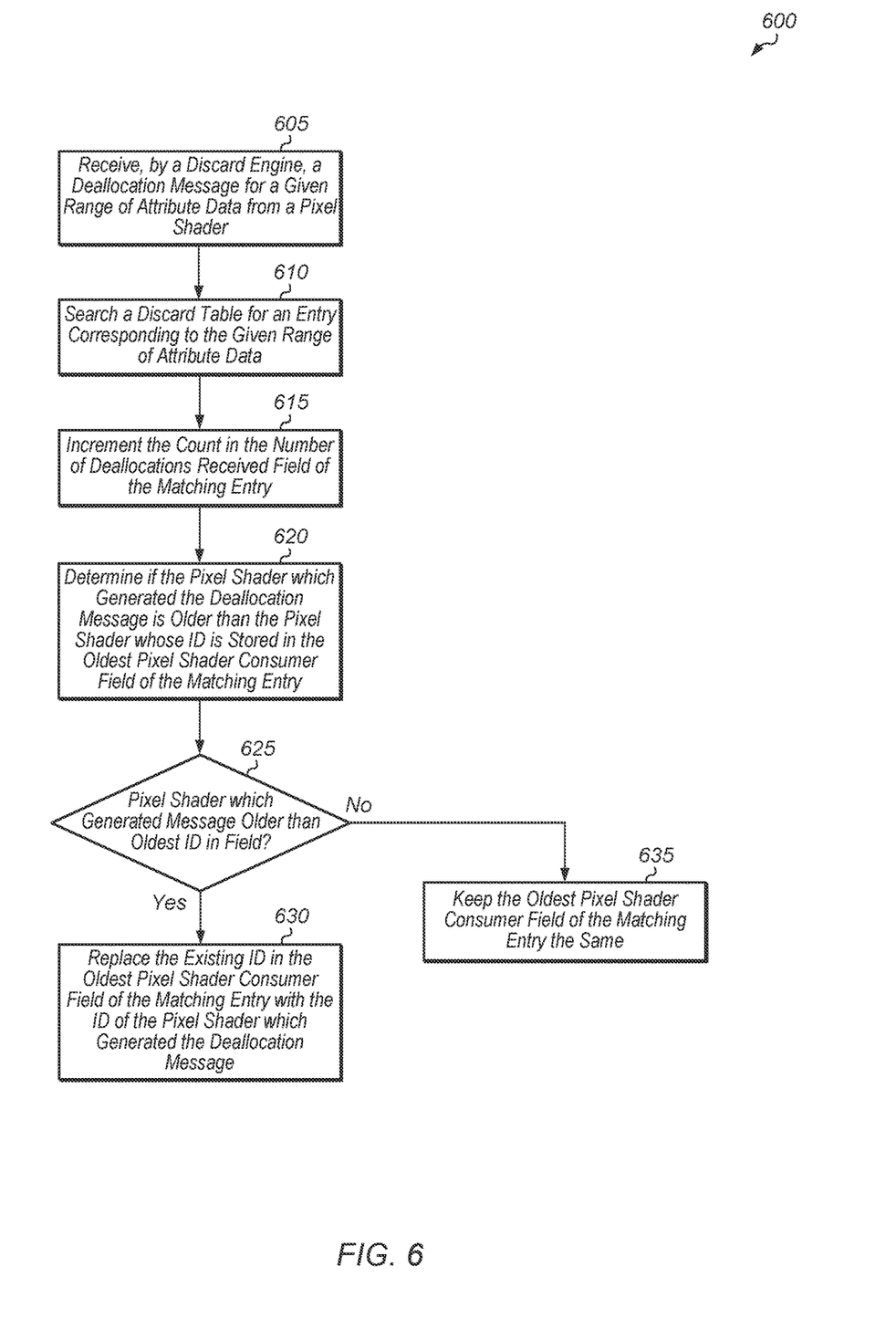
FIG. 6 is a generalized flow diagram illustrating one implementation of a method for managing a discard table.
Figure 7:
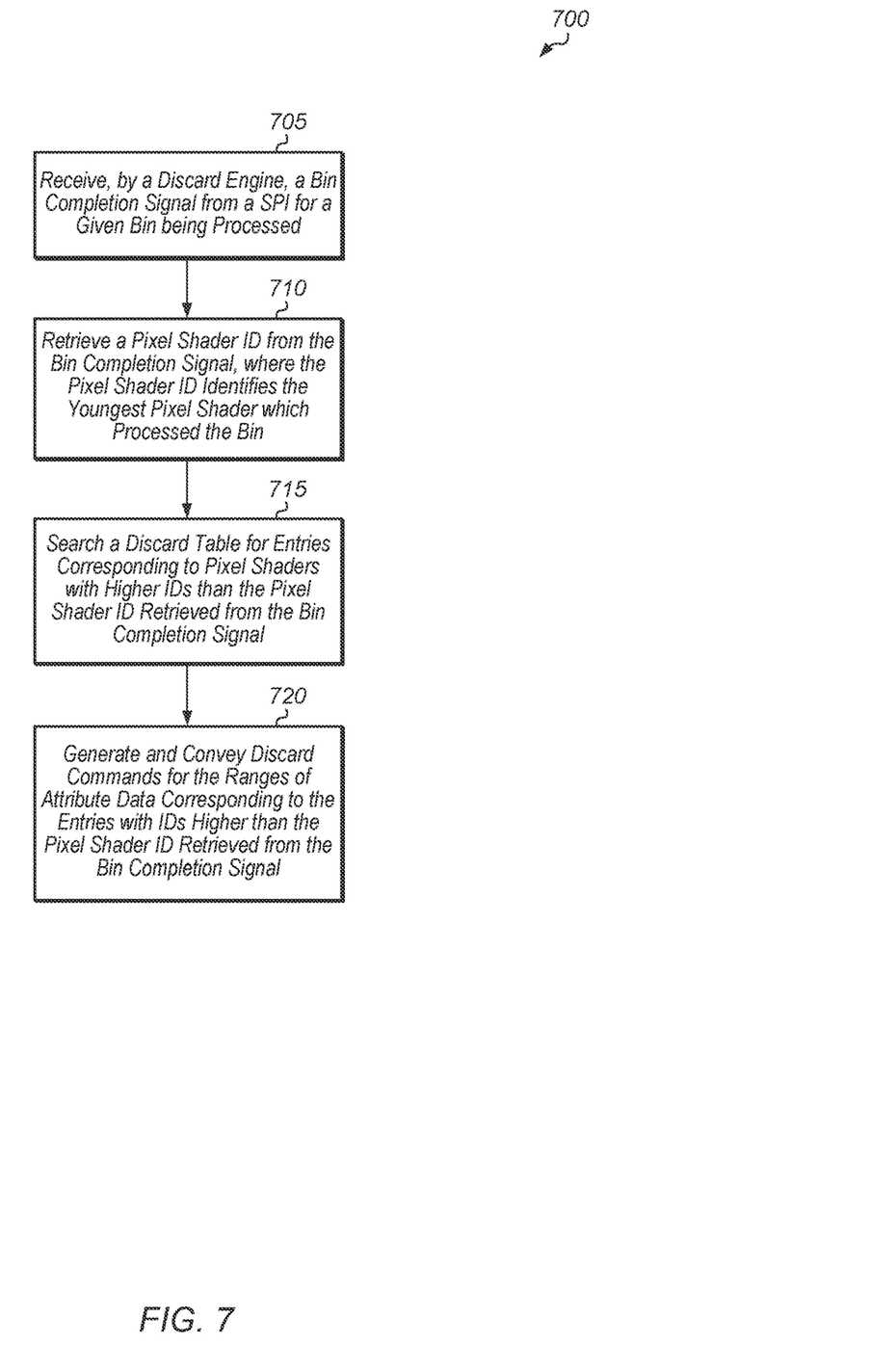
FIG. 7 is a generalized flow diagram illustrating one implementation of a method for generating discard commands.
Figure 8:
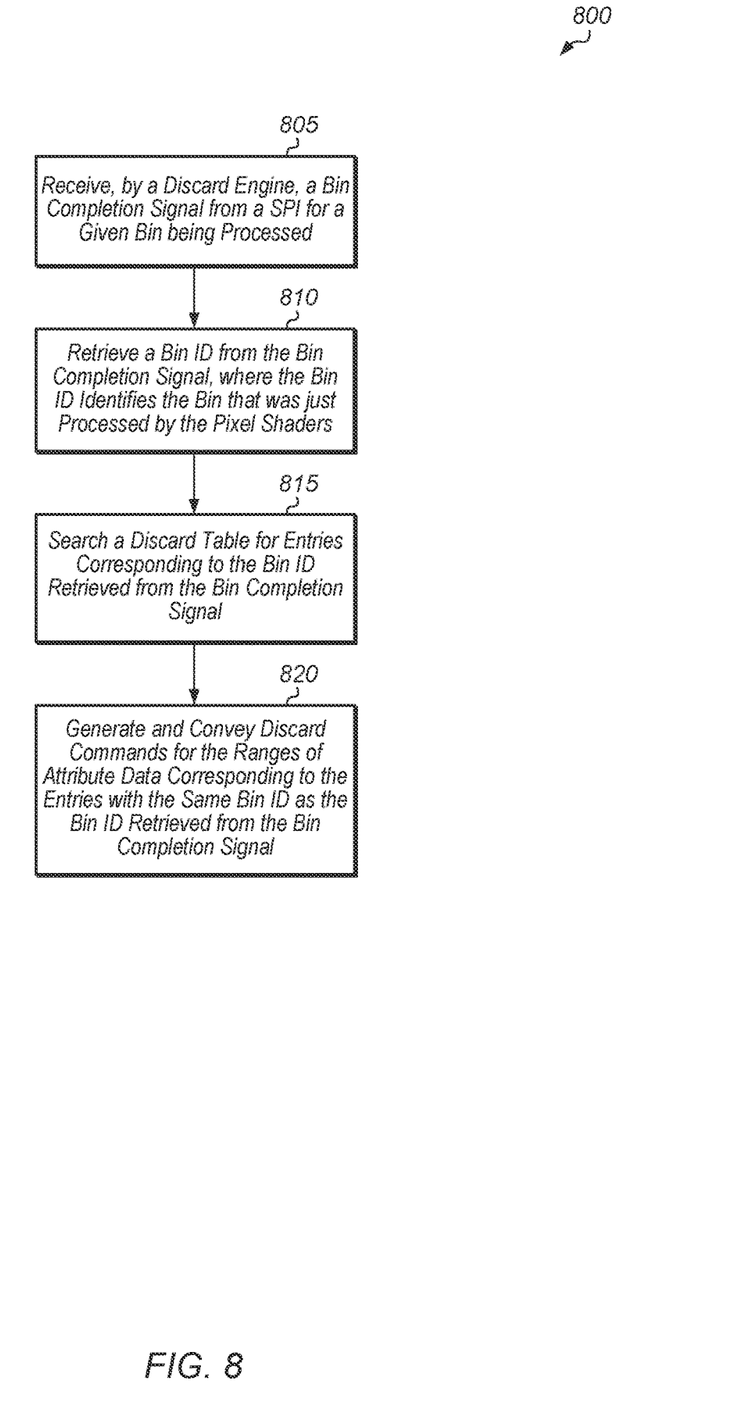
FIG. 8 is a generalized flow diagram illustrating another implementation of a method for generating discard commands.

Referring now to FIG. 5, one implementation of a method 500 for operating a discard engine is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500 (and methods 600-800).

A geometry engine launches shaders which generate attribute data (block 505). After being generated, the attribute data is stored in one or more caches (block 510). At a later point in time, pixel shaders are launched which consume the attribute data (block 515). The pixel shaders send deallocation messages to a discard engine in response to consuming portions of the attribute data (block 520). The discard engine collects deallocation messages and tracks when a given portion of attribute data has been consumed by all of its corresponding pixel shader consumers (block 525). The discard engine sends discard commands to one or more caches when corresponding portions of attribute data can be discarded from the cache(s) (block 530). In response to receiving the deallocation commands, the cache(s) invalidate the corresponding attribute data and prevent writebacks to lower cache levels and/or memory (block 535). After block 535, method 500 ends.

Turning now to FIG. 6, one implementation of a method 600 for managing a discard table is shown. A discard engine (e.g., discard engine 430 of FIG. 4) receives a deallocation message for a given range of attribute data from a pixel shader (block 605). In response to receiving the deallocation message, the discard engine searches a discard table (e.g., discard table 440) for an entry corresponding to the given range of attribute data (block 610). In one implementation, the discard engine searches for the given range of attribute data based on a memory address of the given range. In another implementation, the discard engine searches for the given range of attribute data based on pixel coordinates of the given range of attribute data.

Next, the discard engine increment the count in the number of deallocations received field of the matching entry (block 615). Also, the discard engine determines if the pixel shader which generated the deallocation message is older than the pixel shader whose ID is stored in the oldest pixel shader consumer field of the entry (block 620). In one implementation, the discard engine determines which pixel shader is older based on an ID of the pixel shader, with smaller IDs considered older than larger IDs. In another implementation, the discard engine uses other techniques to determine the relative age of pixel shaders.

If the pixel shader which generated the deallocation message is older than the pixel shader whose ID is stored in the oldest pixel shader consumer field of the entry (conditional block 625, "yes" leg), then the pixel shader replaces the existing ID in the oldest pixel shader consumer field of the matching entry with the ID of the pixel shader which generated the deallocation message (block 630). Otherwise, if the pixel shader which generated the deallocation message is younger than the pixel shader whose ID is stored in the oldest pixel shader consumer field of the entry (conditional block 625, "no" leg), then the oldest pixel shader consumer field of the matching entry remains the same (block 635). After blocks 630 and 635, method 600 ends.

Referring now to FIG. 7, one implementation of a method 700 for generating discard commands is shown. A discard engine (e.g., discard engine 430 of FIG. 4) receives a bin completion signal from a shader processor input (SPI) (e.g., SPI 230A of FIG. 2) for a given bin being processed (block 705). As used herein, the term "bin" is defined as a region of screen space. In one implementation, the screen space is divided into a plurality of rectangular regions or bins. The discard engine retrieves a pixel shader ID from the bin completion signal, where the pixel shader ID identifies the youngest pixel shader which processed the bin (block 710). Next, the discard engine searches a discard table (e.g., discard table 440) for entries corresponding to pixel shaders with higher IDs than the pixel shader ID retrieved from the bin completion signal (block 715). Then, the discard engine generates and conveys discard commands for the ranges of attribute data corresponding to the entries with IDs higher than the pixel shader ID retrieved from the bin completion signal (block 720). After block 720, method 700 ends.

Turning now to FIG. 8, another implementation of a method 800 for generating discard commands is shown. A discard engine (e.g., discard engine 430 of FIG. 4) receives a bin completion signal from a shader processor input (SPI) (e.g., SPI 230A of FIG. 2) for a given bin of primitives (block 805). The discard engine retrieves a bin ID from the bin completion signal, where the bin ID identifies the bin that was just processed by the pixel shaders (block 810). Next, the discard engine searches a discard table (e.g., discard table 440) for entries corresponding to the bin ID retrieved from the bin completion signal (block 815). Then, the discard engine generates and conveys discard commands for the ranges of attribute data corresponding to the entries with the same bin ID as the bin ID retrieved from the bin completion signal (block 820). After block 820, method 800 ends.

Figure 9:
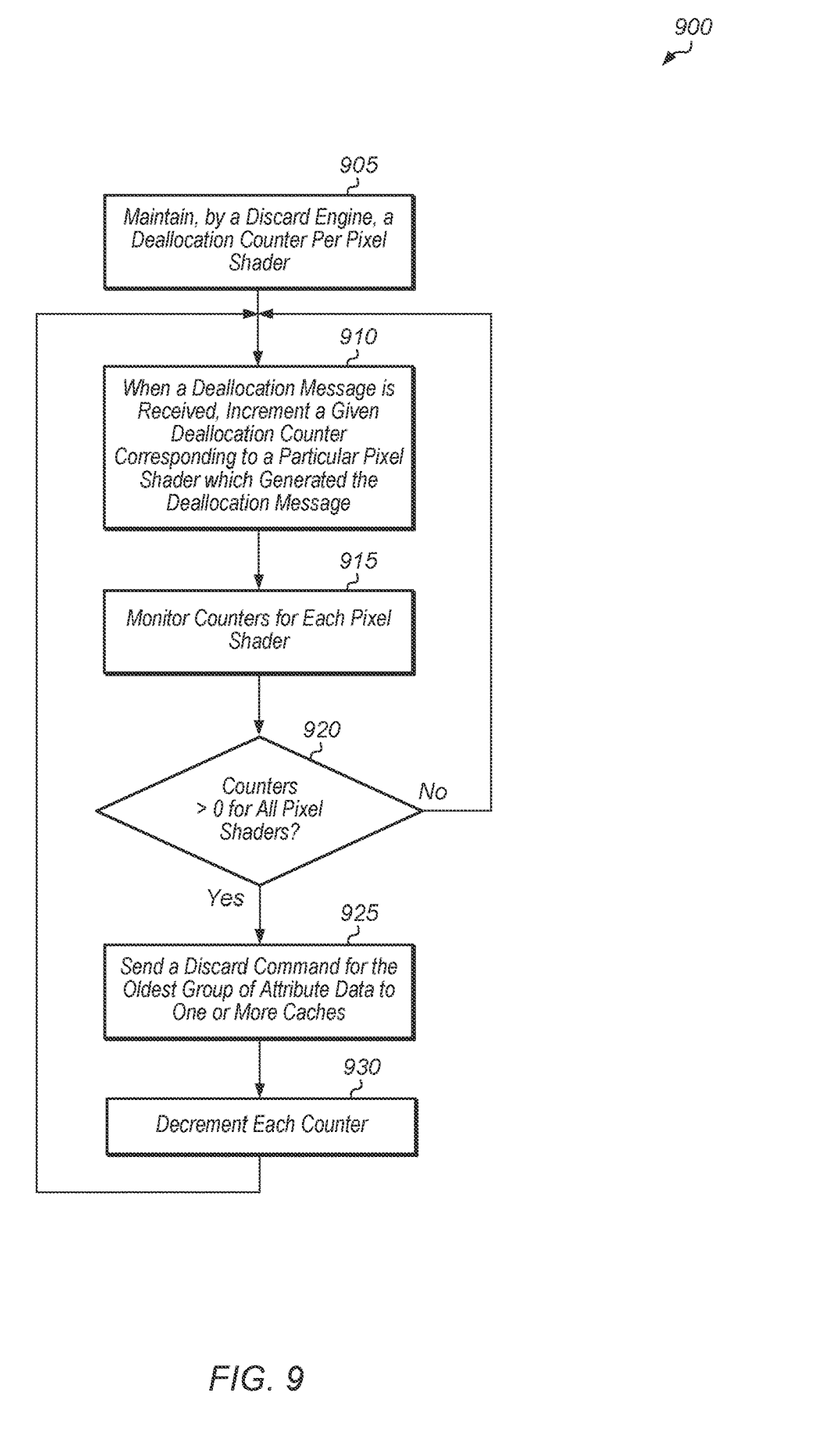
FIG. 9 is a generalized flow diagram illustrating one implementation of a method for performing an ordered discard command generation scheme.

Referring now to FIG. 9, one implementation of a method 900 for performing an ordered discard command generation scheme is shown. A discard engine (e.g., discard engine 430 of FIG. 4) maintains a deallocation counter per pixel shader (block 905). When a deallocation message is received by the discard engine, the discard engine increments a given deallocation counter corresponding to a particular pixel shader which generated the deallocation message (block 910). The discard engine monitors counters for each pixel shader (block 915). If the counters are greater than zero for all of the pixel shaders (conditional block 920, "yes" leg), then this means that all pixel shaders are finished with the oldest group of attribute data and so the discard engine sends a discard command for the oldest group of attribute data to one or more caches (block 925). Next, the discard engine decrements each counter (block 930). After block 930, method 900 returns to block 910. If any counters are still zero for any of the pixel shaders signifying that the oldest group of attribute data is still in use (conditional block 920, "no" leg), then method 900 returns to block 910.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a cache comprising circuitry configured to store attribute data of vertices of each primitive of a set of primitives;
   a plurality of compute units comprising circuitry configured to execute pixel shaders to consume the attribute data; and
   a discard engine comprising circuitry configured to:
   receive a bin completion signal indicating a bin of primitives has been processed by the pixel shaders of the plurality of compute units;
   retrieve, from the bin completion signal, a bin identifier (ID) specifying the bin that has been processed; and
   responsive to a search of a discard table with entries for different ranges of attribute data, generate and convey discard commands for ranges of attribute data having a same bin ID as the bin ID retrieved from the bin completion signal.

2. The apparatus as recited in claim 1, wherein the cache is configured to invalidate the attribute data in the cache responsive to receiving the discard command.

3. The apparatus as recited in claim 2, wherein the cache is further configured to prevent the attribute data from being written to another level of cache or to memory responsive to receiving the discard command.

4. The apparatus as recited in claim 1, wherein the discard engine is configured to:
   track a plurality of attribute deallocation messages generated by the pixel shaders; and
   convey a discard command to the cache, based at least in part on a number of deallocation messages generated by the pixel shaders.

5. The apparatus as recited in claim 1, wherein the discard engine is further configured to:
   track an oldest pixel shader which is consuming a given range of attribute data; and
   store an identifier (ID) of the oldest pixel shader in a given entry of the discard table corresponding to the given range of attribute data.

6. The apparatus as recited in claim 5, wherein the discard engine is further configured to:
   maintain the discard table with the entries for the different ranges of attribute data;
   retrieve a pixel shader ID from the bin completion signal, wherein the pixel shader ID identifies a youngest pixel shader which processed the bin;
   search the discard table for entries corresponding to pixel shaders with higher IDs than the pixel shader ID retrieved from the bin completion signal; and
   generate and convey discard commands for ranges of attribute data corresponding to entries with IDs higher than the pixel shader ID retrieved from the bin completion signal.

7. The apparatus as recited in claim 1, wherein the discard engine is further configured to:
   maintain the discard table with the entries for the different ranges of attribute data; and search the discard table for entries corresponding to the bin ID retrieved from the bin completion signal.

8. A method comprising:
storing, by circuitry of a cache, attribute data of vertices of each primitive of a set of primitives;
executing, by circuitry of a plurality of compute units, pixel shaders to consume the attribute data;
receiving, by circuitry of a discard engine, a bin completion signal indicating a bin of primitives has been processed by the pixel shaders of the plurality of compute units;
retrieving, from the bin completion signal by the discard engine, a bin identifier (ID) specifying the bin that has been processed; and
responsive to a search of a discard table with entries for different ranges of attribute data, generating and conveying discard commands, by the discard engine, for ranges of attribute data having a same bin ID as the bin ID retrieved from the bin completion signal.

9. The method as recited in claim 8, further comprising invalidating the attribute data in a given cache responsive to receiving the discard command.

10. The method as recited in claim 9, further comprising preventing attribute data from being written to another level of cache or to memory responsive to receiving the discard command.

11. The method as recited in claim 8, further comprising:
tracking, by the discard engine, a plurality of attribute deallocation messages generated by the pixel shaders; and
conveying, by the discard engine, a discard command to the cache, based at least in part on a number of deallocation messages generated by the pixel shaders.

12. The method as recited in claim 8, further comprising:
tracking an oldest pixel shader which is consuming a given range of attribute data; and
storing an identifier (ID) of the oldest pixel shader in a given entry of the discard table corresponding to the given range of attribute data.

13. The method as recited in claim 12, further comprising:
maintaining the discard table with the entries for the different ranges of attribute data;
retrieving a pixel shader ID from the bin completion signal, wherein the pixel shader ID identifies a youngest pixel shader which processed the bin;
searching the discard table for entries corresponding to pixel shaders with higher IDs than the pixel shader ID retrieved from the bin completion signal; and
generating and conveying discard commands for ranges of attribute data corresponding to entries with IDs higher than the pixel shader ID retrieved from the bin completion signal.

14. The method as recited in claim 8, further comprising:
maintaining the discard table with the entries for the different ranges of attribute data;
searching the discard table for entries corresponding to the bin ID retrieved from the bin completion signal.

15. A system comprising:
a cache; and
a discard engine comprising circuitry configured to:
receive a bin completion signal indicating a bin of primitives has been processed by pixel shaders of a plurality of compute units comprising circuitry configured to execute pixel shaders to consume attribute data of vertices of each primitive of a set of primitives;
retrieve, from the bin completion signal, a bin identifier (ID) specifying the bin that has been processed; and
responsive to a search of a discard table with entries for different ranges of attribute data, generate and convey discard commands to a cache for ranges of attribute data having a same bin ID as the bin ID retrieved from the bin completion signal.

16. The system as recited in claim 15, wherein the cache is configured to invalidate the attribute data in the cache responsive to receiving the discard command.

17. The system as recited in claim 16, wherein the discard engine is configured to:
maintain a plurality of counts including a separate count for each of the plurality of pixel shaders; and
change a count associated with a given pixel shader, responsive to receiving a deallocation message from the given pixel shader;
wherein the number of deallocation messages generated is based at least in part on the plurality of counts.

18. The system as recited in claim 15, wherein the discard engine is configured to:
maintain a discard table with entries for different ranges of attribute data;
receive a bin completion signal comprising a pixel shader ID; and
convey discard commands for ranges of attribute data corresponding to entries of the discard table with IDs higher than the pixel shader ID included in the bin completion signal.

19. The system as recited in claim 15, wherein the discard engine is further configured to:
track an oldest pixel shader which is consuming a given range of attribute data; and
store an identifier (ID) of the oldest pixel shader in a given entry corresponding to the given range of attribute data.

20. The system as recited in claim 15, wherein the discard engine is further configured to:
maintain a discard table with entries for the different ranges of attribute data; and
search the discard table for entries corresponding to pixel shaders with higher IDs than the pixel shader ID retrieved from the bin completion signal.

* * * * *

UNITED STATES PATENT AND TRADEMARK OFFICE
CERTIFICATE OF CORRECTION

| | | |
|---|---|---|
| PATENT NO. | : 12,236,529 B2 | Page 1 of 1 |
| APPLICATION NO. | : 17/562653 | |
| DATED | : February 25, 2025 | |
| INVENTOR(S) | : Brennan et al. | |

It is certified that error appears in the above-identified patent and that said Letters Patent is hereby corrected as shown below:

In the Claims

Column 8, Claim 4, Line 37, please delete "is configured to;" and insert -- is configured to: --.

Signed and Sealed this
Thirteenth Day of May, 2025

Coke Morgan Stewart
*Acting Director of the United States Patent and Trademark Office*